May 20, 1952 P. W. JOHNSON 2,597,644
WHEEL TYPE SCREW THREAD GAUGE

Filed Nov. 16, 1945 3 Sheets-Sheet 1

INVENTOR
Paul W. Johnson
BY
Bohleber, Jacott & Montstream
ATTORNEYS

May 20, 1952  P. W. JOHNSON  2,597,644
WHEEL TYPE SCREW THREAD GAUGE
Filed Nov. 16, 1945  3 Sheets-Sheet 2
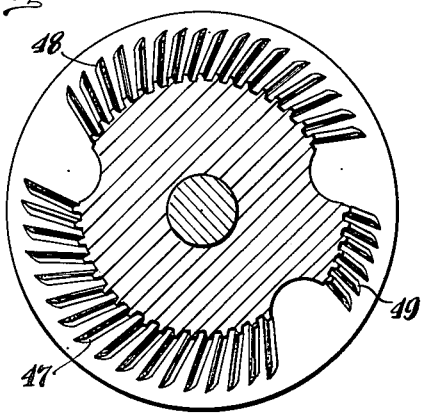
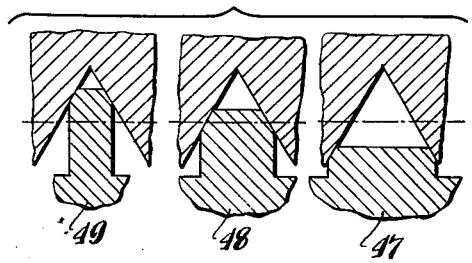
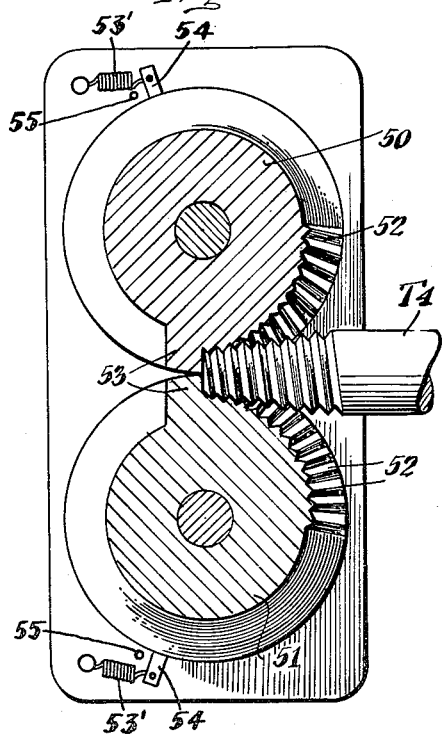
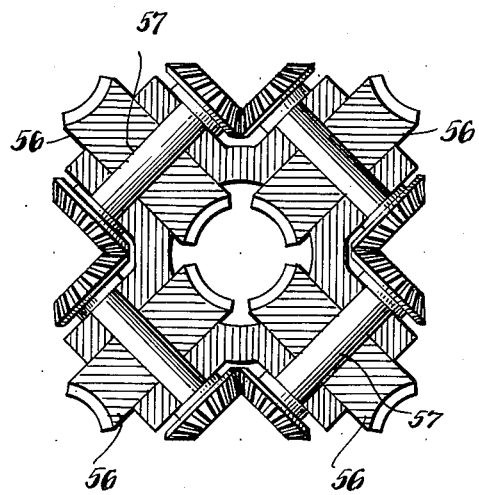
INVENTOR
Paul W. Johnson
ATTORNEYS May 20, 1952 P. W. JOHNSON 2,597,644
WHEEL TYPE SCREW THREAD GAUGE Filed Nov. 16, 1945 3 Sheets-Sheet 3

INVENTOR
Paul W. Johnson
BY Bohleber, Fassett & Montstream
ATTORNEYS

Patented May 20, 1952

2,597,644

UNITED STATES PATENT OFFICE 2,597,644

WHEEL TYPE SCREW THREAD GAUGE

Paul W. Johnson, Bloomfield, Conn.

Application November 16, 1945, Serial No. 629,107

18 Claims. (Cl. 33—199)

The invention relates to a gage for gaging screw threads in which the gaging elements are circular or in the form of a wheel with gaging teeth upon the periphery of the wheels of the gage which are substantially parallel with the pivot mounting therefor so that a threaded part to be gaged is presented axially to the gaging wheels. The gage can be used very advantageously to quickly gage a thread. Also the gage can expeditiously gage a long thread without the gage having dimensions comparable to the thread being gaged and hence avoids being cumbersome as would be the case with a gage constructed in known manner.

It is an object of the invention to construct a wheel type gage of at least one pair of wheels in which gaging teeth are provided upon the periphery thereof and extend substantially parallel with respect to the pivot means for the gaging wheels so that the threaded part is presented axially thereto.

Another object of the invention is to construct wheel type gages for either internal or external threads.

A still further object of the invention is to construct a wheel type gage having means whereby the gaging teeth of the wheels are aligned so that corresponding gaging teeth on each pair of wheels are brought into cooperative relation which is particularly suitable for a wheel gage used for gaging a taper thread.

Another object is to construct a wheel type gage which can receive and gage a test part having an enlarged portion adjacent to the screw thread.

Other objects of the invention will be apparent from the following description taken in connection with the accompanying drawings illustrating preferred embodiments thereof in which:

Figure 6 is a plan view of a sectional type of gaging wheel.

Figure 7 shows the form of gaging ridges or teeth on each section of the gaging wheel of Figure 6.

Figure 8 shows a partial plan view of a wheel gage showing gaging wheels with an abutment form of aligning means for assuring that corresponding or cooperating gaging teeth on each pair of gaging wheels are in proper aligned relation with respect to each other.

Figure 9 is a section through a gage having a plurality of pairs of gaging wheels.

The gage has a frame 9 of suitable construction that illustrated being a flat U-shaped member 10 and a plate 11 secured thereto closing the open side of the U member. The plate 11 is not essential and is provided to enable the pivot means to have support at each end thereof and to protect the gaging wheels.

Figure 2:
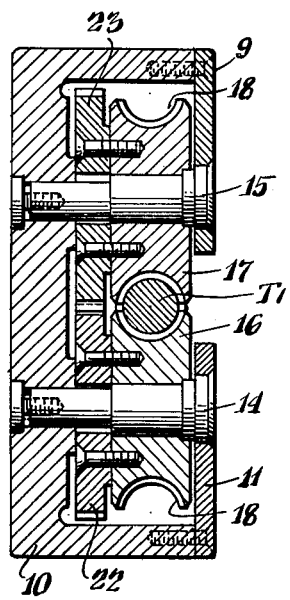
Figure 2 is a cross section taken on line 2—2 of Figure 1.
Figure 1:
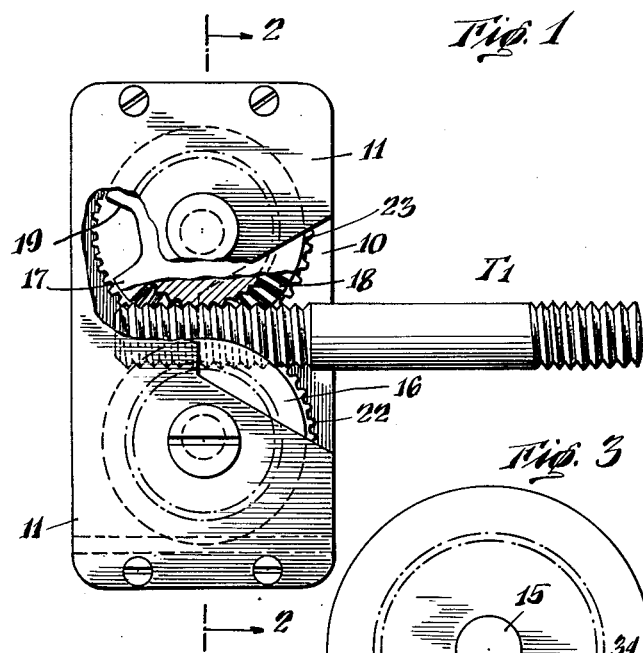
Figure 1 is an elevation of the wheel gage with a threaded stub being gaged between the gaging wheels.

The frame 9 carries a pair of spaced pivot means 14 and 15 each of which carries a gaging wheel 16 and 17 respectively. One or both pivot means may have an eccentric portion or bearing for adjusting the gaging wheels towards and from each other. The peripheries of each gaging wheel carry gaging teeth or ridges 18 which for testing an external thread have a concave conformation. One pair of gaging wheels is illustrated in Figures 1 and 2.

The gaging teeth or ridges upon each gaging wheel have a perfect gaging conformation at and adjacent the minimum diameter and the form of the teeth changes as the wheel diameter increases toward the outer periphery of the gaging wheel. This change in the form of the gaging teeth at points on either side of the minimum diameter of the gaging wheel, or point of contact with a diameter of a test part, is required in order to prevent interference with the thread of the test part because of the greater radius of swing at the greater diameter of the gaging wheel or gaging teeth. If the gaging wheels are relatively large, the gaging teeth could more nearly approach a thread form throughout their length since there would be less interference at these side portions of the gaging teeth. The smaller the gaging wheels the greater the amount of interference and hence requires that the gaging teeth gradually diminish on each side. It is for this reason that the gaging teeth are preferably formed by generating the gaging ridges on the gaging wheels with a gaging tooth generator corresponding to the thread of the test part to be gaged. It may well be that for very small wheels there will be no gaging teeth whatever at the extreme outer periphery of each of the side portions of the concave gaging shape of the gaging wheel. However the concave form, irrespective of whether or not the outer portions thereof carry these gaging ribs, assists in guiding and aligning the test part between the gaging wheels.

Since the gaging teeth or ribs are for gaging threads previously formed upon a test part, they are smooth and continuous for gaging contact only. The gaging teeth contact only with the faces or flanks of the helical ridges of the thread of the test part.

If the diameter of the gaging wheel is carefully determined, a continuous set of gaging teeth may be provided around the entire periphery of each gaging wheel. It is simpler, however, to provide a gap 19 in the periphery of each gaging wheel and with this gap it is immaterial what the diameter of the gaging wheel is since any unequal spacing between the teeth at the beginning and the end of the peripheral series of gaging teeth does not appear.

In a wheel gage for gaging the thread of a test part of uniform diameter throughout its length, the threads on the test part in conjunction with the gaging teeth upon the gaging wheels automatically align the gaging ridges upon each of the gaging wheels in proper relation. If desired, however, the two gaging wheels may be geared together in any suitable fashion such as by a gear 22 carried by or secured to the gaging wheel 17 which meshes with a similar gear 23 carried by or secured to the gaging wheel 17. Sufficient play is provided between the teeth of the gear wheels so that adjustment of the eccentric pivot means will occasion no interference between the gear teeth.

A test part is presented axially to the concave gaging teeth or ridges formed on the periphery of the gaging wheels. As the test thread is inserted axially therebetween, the gaging wheels rotate and bring succeeding gaging teeth into contact with the thread on the test part. If the test thread is of considerable length the gage can test the entire thread length by several revolutions of the gaging wheels. A relatively small gage can thereby gage a thread of considerable length. Where the thread to be gaged is relatively long requiring more than one revolution of the gaging wheels it is desirable that a continuous series of gaging ribs or teeth be provided around the entire periphery of the gaging wheels and without the gap 19. As previously mentioned effective gaging occurs specifically at and adjacent to the minimum diameter of the gaging wheels. It is clear that the test part may be inserted between the gaging wheels then turned through a partial revolution and withdrawn. This procedure will gage the test part on two diameters. It is also clear that the test part may be inserted between the gaging wheels and withdrawn, then turned and reinserted to present a different diameter between the gaging wheel. Several such reinsertions with the test part turned a small angle each time will quickly gage the entire circumference of the thread on the test part.

Figure 3:
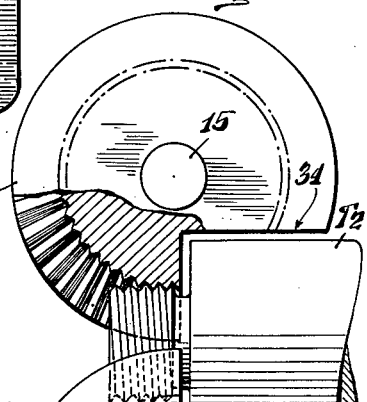
Figure 3 is a plan view showing two gaging wheels constructed so that the thread of a part to be gaged, having an enlarged portion adjacent to the threads, can be gaged.

Numerous test parts such as a test part T2 shown in Figure 3 have a threaded portion of relatively small diameter and an enlarged portion adjacent to the threaded portion. In order to enable the threads adjacent to the enlarged portion to be gaged, the gaging wheels 32 and 33 may have a recess 34 therein to provide clearance for the enlarged portion of the test part and so that the gaging wheel may engage the thread on the test part directly at the shoulder of the enlarged portion.

Figure 5:
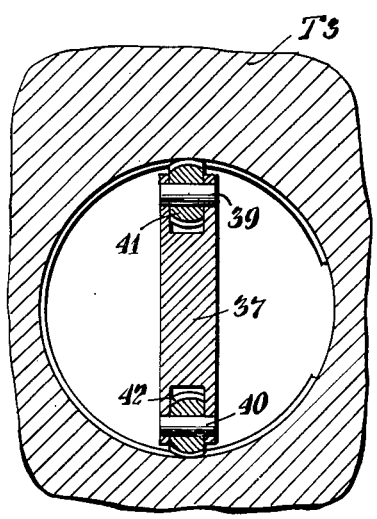
Figure 5 is a section through the internal wheel gage taken on line 5—5 of Figure 4.
Figure 4:
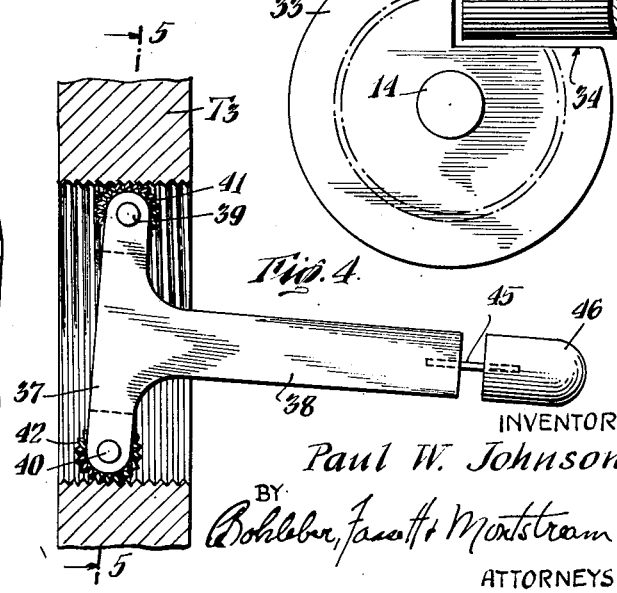
Figure 4 is a plan view of a wheel gage for gaging internal threads. The gage is shown within an internal thread which is in section.

The wheel gage may be constructed so that internal threads may be gaged as shown in Figures 4 and 5. In this construction the gage includes a frame 37 which may be of T conformation and includes a handle portion 38. The frame carries a pair of spaced pivot means 39 and 40 upon which are pivotally mounted gaging wheels 41 and 42. The pivot means may be of the eccentric construction for adjustment of the gaging wheels. The gaging wheels have gaging teeth extending substantially parallel with the axis of the pivot means. The gaging teeth or ridges are convex in conformation as shown in Figure 5. Preferably the gaging teeth have a convexity greater than that of the internal thread of the test part T3.

The handle portion may if desired provide a resilient operating handle. This operating handle may be constructed in several ways, that illustrated including a thin resilient connecter 45 secured to the end of the handle portion 38 of the frame and the other end of which carries an operating handle or knob 46. The operator by holding the knob 46 may swing the T-shaped frame upwardly within the internal thread and by a swinging motion gage the internal thread. The resilient connector 45 aids an inspector so that too great pressure is not exerted in swinging the gaging handle during the gaging operation.

The better way to gage an internal thread with the gage shown in Figures 4 and 5 is to tilt the frame and insert one gaging wheel within the internal thread. The frame is then swung diametrically or upwardly about one gaging wheel as a pivot so that the other gaging wheel will pass through gaging position. For a long internal thread the gage may be walked through the thread by such oscillation of the gage. It is evident too that the gage may be projected axially through the internal thread. With this latter method of gaging an internal thread, care must be exercised so that the gaging wheels are presented to the internal thread in exact vertical or very near vertical relation with respect to the thread.

Instead of the gaging wheels shown in Figures 1 and 2, a gaging wheel such as shown in Figures 6 and 7 may be used in place thereof. This gaging wheel has a plurality of sections 47, 48 and 49 for gaging particular points on the flanks of a thread of a test part. In other words, the section 47 may have a small diameter so that it engages the flanks of a thread to be gaged at the outer diameter thereof. The section 48 may be formed to engage at the pitch diameter of the thread of the test part. The portion 49 may be formed to engage only the root of the thread. A pair of such gaging wheels provide a gage which not only tests for the pitch diameter of a thread of the test part but will also determine whether or not the angle of the flanks of the thread is proper. For example assume that the pitch diameter is proper, then if the thread angle is too great, the outer diameter will be relatively narrow and the gaging wheels or section 47 will bind. If the angle is too great then the root of the thread will be relatively narrow and the gaging wheels or section 49 will bind.

The wheel gage is suitable for gaging a tapered thread as shown in the construction of Figure 8. This gage includes a pair of gaging wheels 50 and 51 having a series of gaging teeth 52 on the periphery thereof which may be of increasing diameter. Means are provided to align the two gaging wheels with respect to each other so that corresponding gaging teeth are opposite each other when a test part is being gaged. The gaging wheels shown in Figure 8 may be aligned by means of gears as illustrated in Figure 1. Another form of construction for securing alignment is illustrated in Figure 8 in which each gaging wheel is provided with an abutment 53. The test part T4 with a taper thread is presented to the gaging wheels and the end thereof engages the abutments 53. The gaging wheels therefore are brought into alignment by bringing the abutments into alignment after which the gaging teeth or ribs on the gaging wheels with the taper thread on the test part maintain the gaging wheels and corresponding teeth thereupon in alignment with each other. This abutment form of aligning means may be used for straight threads as well, in place of the gear aligning means of Figures 1 and 2.

Means may be provided if desired to restore the gaging wheels to their proper starting position as shown in Figure 8 and is applicable to the constructions illustrated and particularly to that of Figures 1 and 2 and Figure 3. This means may take any suitable form, that illustrated including a spring 53' one end of which is secured to a pin 54 carried by the wheel. A stop of any suitable kind may be provided such as the pin 55 which is engaged by the pin 54 on the gaging wheel to position the wheels in starting position. With this construction the abutments 53 may be dispensed with although they aid in the initial insertion of the test part.

The wheel gage of either the internal or external thread type may have a plurality of pairs of gaging wheels to engage the thread of a test part. Figure 9 illustrates a construction of wheel gage of the external thread type which utilizes a plurality of pairs of gaging wheels 56 having concave gaging teeth or ribs on the periphery thereof which are substantially parallel to or in a radial plane substantially including the axis of their respective pivot means 57. This gage engages four positions on the periphery of the test part. It is clear that additional pairs of gaging wheels may be provided if desired. The gaging wheels may be geared or otherwise aligned to retain corresponding gaging teeth in cooperative relation.

Figure 10:
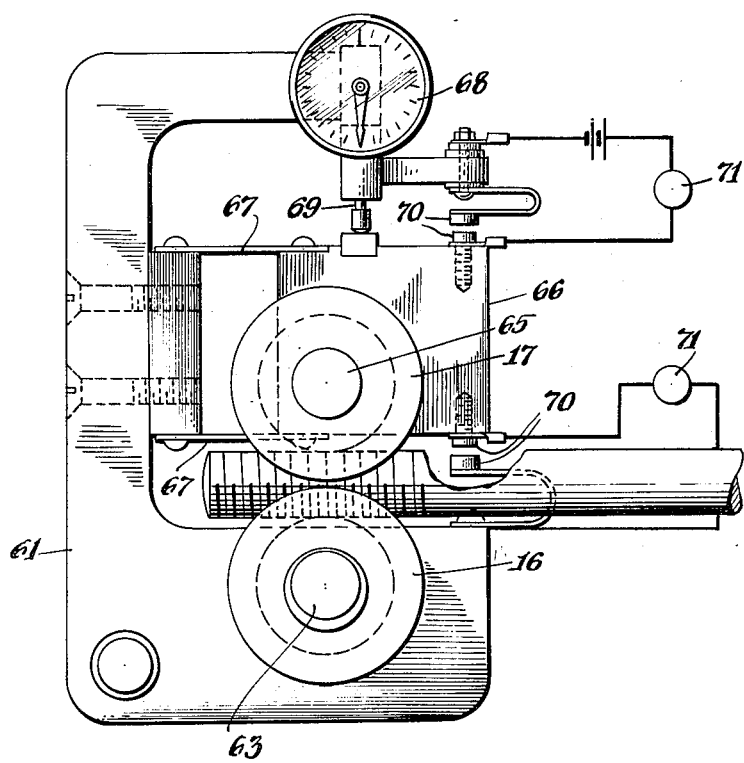
Figure 10 is a side elevation of a wheel gage in which an indicator responds to the diameter of the test part passed therethrough.

Figure 10 illustrates a construction of wheel gage which utilizes a dial indicator or gage to determine whether or not a test part is within the permissible tolerances. In this gage a frame 61 carries a gaging wheel which may be like any of the gaging wheels described herein such as gaging wheel 16 which has thread gaging ribs or teeth in the periphery thereof which extend substantially parallel with the axis of the wheel or are in or substantially in radial planes including the axis of the gaging wheel. The gaging wheel is mounted for rotation upon a pivot means 63 which may be adjustable. A cooperating gaging wheel 17, similar to the gaging wheel 16, is mounted upon the pivot 65 carried by a block 66. The gaging wheels may be of any of the forms described herein.

The block 66 is mounted in any suitable fashion for lateral movement so that the gaging wheel 17 may move laterally towards and away from the gaging wheel 16. The mounting may be a parallel type of mounting such as formed by a pair of spaced springs 67 one end of each of which is secured to the block 66 and the other end is secured to the frame 61.

A dial indicator 68 is carried by the frame and its operating means 69 engages the block 66 to indicate the position or movement of the block and hence of the gaging wheel 17 carried thereby. In addition to the dial indicator, switch contacts 70 may be provided, one being carried by the frame 61 and the other being carried by the movable block 66. The contacts are adjusted to a position in which they are spaced apart a distance, corresponding to the upper limit of size so that when an oversized screw or test part is inserted between the gaging wheels the contacts close and illuminate a lamp 71. Duplicate switching means, upon the underside of the block 66, and lamp may be provided for signaling in like manner that a test part is smaller than the allowable tolerance in addition to the indication provided by the dial indicator.

Figure 11:
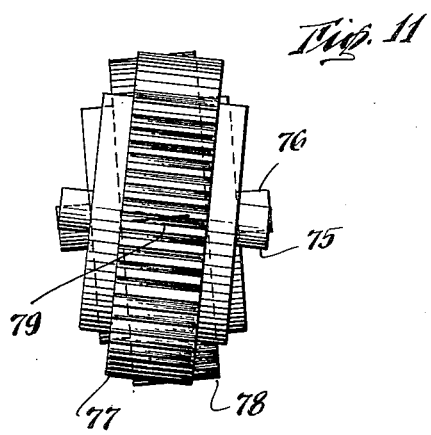
Figure 11 is a top view of a wheel gage having angularly disposed pivot means.

It has been pointed out that each gaging tooth is substantially in a radial plane including the axis of the gaging wheel. There is a small angularity however, between the gaging ribs and the axis of the wheel, occasioned by the fact that the gaging ribs have an angularity conforming to the helix angle of the thread upon the test part. This angular direction of the gaging ribs is necessary when the axes of both gaging wheels are parallel to each other. It is apparent as shown in Figure 11 that the pivot pins or means 75 and 76 of the gaging wheels 77 and 78 may be disposed at an angle with respect to each other corresponding to twice the helix angle of the thread to be gaged. The pivot means of one gaging wheel is turned at an angle with respect to a normal axis and in one direction equal to the helix angle of the screw thread and the pivot means for the cooperating wheel is turned at an equal angle in the opposite direction so that the two pivot means are directed at an angle with respect to each other equal to twice the helix angle of the thread to be tested. With the pivot means of the gaging wheels so directed, the gaging ribs or ridges 79 may be parallel with respect to the axis of their respective pivot pin or gaging wheel, or in a radial plane including the axis of the pivot means in the event a peripheral groove form of gaging wheel is used. It is preferable in the latter case that the gaging ribs be generated by a threaded part corresponding to the thread to be gaged.

Although the gaging wheels illustrated have a concave groove in the periphery thereof, formed by the gaging ribs or ridges, which corresponds with the diameter of the thread to be tested, it is clear that, since the wheel gage is essentially a pitch diameter gage, the curvature of the groove may be greater than that of the test part. As a matter of fact, the gaging ribs or teeth may be straight as shown in Figure 11 which with the angular displacement of the axis of each wheel corresponding to the helix angle of the test part, would result in a gaging wheel not greatly different in appearance from a spur gear. The tooth or gaging rib form would correspond with the thread being tested. In the latter or spur gear form, which would not have a concave groove in the periphery of the gaging wheel to align the test part, means may be provided to align the test part with the gaging wheels.

It is to be understood too that a gaging wheel with a concave groove in the periphery thereof may be mounted in cooperative relation with a gaging wheel having a straight or flat periphery. Again, the gaging wheels may have a double angularity, that is the pivot means be disposed at an angle less than the helix angle of the thread of the test part and some angularity in the disposition of the gaging ribs in the periphery of the gaging wheels.

The gaging wheels in all forms of the gage illustrated, whether of the concave, straight or convex form, engage a test part at a plurality of points around the circumference of the test part. In other words each wheel engages the circumference of the test part at least at one point and a plurality of wheels engage the circumference at a plurality of points. At least one pivot means and hence its gaging wheel in all constructions is fixed to the frame when in use even though it may be adjustable. In some of the gages illustrated all pivot means and their respective gaging wheels are fixed to the frame.

The relationship between the axis of the pivot means and the plane of the gaging teeth has been described as being substantially in the same plane or a parallel plane by which is meant that the relationship may be in a range from the same plane as shown in Figure 11, to an angularity between the planes thereof in excess of the helix angle of a perfect test thread. When the relative angularity is equal to the helix angle, the pivot means are parallel to each other. The angularity is unimportant except in the two specific forms illustrated which provide particular advantages. The angularity should not exceed that in which axial projection of the test part between the wheel gage elements becomes difficult.

The invention is presented to fill a need for improvements in a wheel gage. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A thread gage for gaging threads previously formed on a test part comprising a frame, a plurality of wheels having smooth thread gaging teeth around at least a portion of the periphery thereof for contact only with a test part at a plurality of points around the circumference thereof and which test part moves axially only with respect thereto, pivot means for each wheel carried by the frame in spaced relation and supporting the wheels in cooperating relation, at least one of the pivot means being fixed to the frame, the axis of the pivot means and the thread gaging teeth having a relationship with respect to each other ranging from being in the same plane to an angularity between the planes thereof in excess of the helix angle of a perfect thread, and the wheels being rotated solely by the engagement of the threads on the test part with the gaging teeth of the wheels.

2. A thread gage for gaging threads previously formed on a test part comprising a frame, a plurality of wheels having smooth thread gaging teeth around at least a portion of the periphery thereof for contact only with a test part at a plurality of points around the circumference thereof and which test part moves axially only therebetween, pivot means for each wheel carried by the frame in spaced relation and supporting the wheels in cooperating relation, at least one of the pivot means being fixed to the frame, the axis of the pivot means and the thread gaging teeth having a relationship with respect to each other ranging from being in the same plane to an angularity between the planes thereof in excess of the helix angle of a perfect thread, means for aligning the wheels and the thread gaging teeth thereon for rotating the same in cooperative relation, and the wheels being rotated solely by the engagement of the threads on the test part with the gaging teeth of the wheels.

3. A thread gage for gaging threads previously formed on a test part comprising a frame, a plurality of pairs of wheels having smooth thread gaging teeth around at least a portion of the periphery thereof for contact only with a test part at a plurality of points around the circumference thereof and which test part moves axially only therebetween, pivot means for each wheel carried by the frame in spaced relation and supporting the wheels in cooperating relation, at least one of each pair of pivots being fixed to the frame, the axis of the pivot means and the thread gaging teeth having a relationship with respect to each other ranging from being in the same plane to an angularity between the planes thereof in excess of the helix angle of a perfect thread, and the wheels being rotated solely by the engagement of the threads on the test part with the gaging teeth of the wheels.

4. A thread gage for gaging threads previously formed on a test part comprising a frame, a plurality of wheels having smooth thread gaging teeth around at least a portion of the periphery thereof for contact only with a test part at a plurality of points around the circumference thereof and which test part moves axially only therebetween, pivot means for each wheel carried by the frame in spaced relation and supporting the wheels in cooperating relation, at least one of the pivots being fixed to the frame, the axis of the pivot means and the thread gaging teeth having a relationship with respect to each other ranging from being in the same plane to an angularity between the planes thereof in excess of the helix angle of a perfect thread, gear means connecting the wheels for aligning the same and the thread gaging teeth thereon for rotating the same in cooperative relation, and the wheels being rotated solely by the engagement of the threads on the test part with the gaging teeth of the wheels.

5. A thread gage for gaging threads previously formed on a test part comprising a frame, a plurality of wheels having smooth thread gaging teeth around at least a portion of the periphery thereof for contact only with a test part at a plurality of points around the circumference thereof and which test part moves axially only therebetween, pivot means for each wheel carried by the frame in spaced relation and supporting the wheels in cooperating relation, at least one of the pivots being fixed to the frame, the axis of the pivot means and the thread gaging teeth having a relationship with respect to each other ranging from being in the same plane to an angularity between the planes thereof in excess of the helix angle of a perfect thread, and abutment means carried by the wheels for aligning the same and the thread gaging teeth thereon for rotating the same in cooperative relation.

6. A thread gage for gaging threads previously formed on a test part comprising a frame, a plurality of wheels having smooth thread gaging teeth around at least a portion of the periphery thereof for contact only with a test part at a plurality of points around the circumference thereof and which test part moves axially only therebetween, pivot means for each wheel carried by the frame in spaced relation and supporting the wheels in cooperating relation, at least one of the pivots being fixed to the frame, the axis of the pivot means and the thread gaging teeth having a relationship with respect to each other ranging from being in the same plane to an angularity between the planes thereof in excess of the helix angle of a perfect thread, and a recess in the periphery of each wheel extending radially inwardly from the gaging teeth.

7. A thread gage for gaging threads previously formed on a test part comprising a frame, a plurality of wheels having smooth thread gaging teeth around at least a portion of the periphery thereof for contact only with a test part at a plurality of points around the circumference thereof and which test part moves axially only therebetween, pivot means for each wheel carried by the frame in spaced relation and supporting the wheels in cooperating relation, at least one of the pivots being fixed to the frame, the axis of the pivot means and the thread gaging teeth having a relationship with respect to each other ranging from being in the same plane to an angularity between the planes thereof in excess of the helix angle of a perfect thread, means for aligning the wheels and the thread gaging teeth thereon for rotating the same in cooperative relation, and a recess in the periphery of each wheel extending radially inwardly from the gaging teeth.

8. A thread gage for gaging internal threads previously formed on a test part comprising a frame, a plurality of wheels having smooth convex thread gaging teeth around at least a portion of the periphery thereof for contact only with the internal threads of a test part at a plurality of points around the circumference thereof and upon axial movement with respect thereto, pivot means for each wheel carried by the frame in spaced relation and supporting the wheels, at least one of the pivots being fixed to the frame, the axis of the pivot means and the thread gaging teeth having a relationship with respect to each other ranging from being in the same plane to an angularity between the planes thereof in excess of the helix angle of a perfect thread, and the wheels being rotated solely by the engagement of the threads on the test part with the gaging teeth of the wheels.

9. A thread gage for gaging internal threads previously formed on a test part comprising a frame, a plurality of wheels having smooth convex thread gaging teeth around at least a portion of the periphery thereof for contact only with the internal threads of a test part at a plurality of points around the circumference thereof and upon axial movement with respect thereto, pivot means for each wheel carried by the frame in spaced relation and supporting the wheels, at least one of the pivots being fixed to the frame, the axis of the pivot means and the thread gaging teeth having a relationship with respect to each other ranging from being in the same plane to an angularity between the planes thereof in excess of the helix angle of a perfect thread, and the wheels being rotated solely by the engagement of the threads on the test part with the gaging teeth of the wheels, and a handle resiliently carried by the frame.

10. A thread gage for gaging threads previously formed on a test part comprising a frame, a plurality of wheels having smooth thread gaging teeth around at least a portion of the periphery thereof for contact only with a test part at a plurality of points around the circumference thereof and which test part moves axially only therebetween, each wheel having a plurality of sections one section on each wheel cooperating with a like section on its cooperating wheel, each section on a wheel having different thread gaging teeth to engage a different portion of the thread being gaged, pivot means for each wheel carried by the frame in spaced relation and supporting the wheels in cooperating relation, at least one pivot means being fixed to the frame, the axis of the pivot means and the thread gaging teeth having a relationship with respect to each other ranging from being in the same plane to an angularity between the planes thereof in excess of the helix angle of a perfect thread, gear means connecting the wheels for aligning the same and the thread gaging teeth thereon for rotating the same in cooperative relation, and the wheels being rotated solely by the engagement of the threads on the test part with the gaging teeth of the wheels.

11. A thread gage for gaging external threads previously formed on a test part comprising a frame, a plurality of wheels having smooth thread gaging teeth forming a concave circumferential groove around at least a portion of the periphery thereof for contact only with a test part at a plurality of points around the circumference thereof and which test part moves axially only therebetween, pivot means for each wheel carried by the frame in spaced relation and supporting the wheels in adjacent cooperating relation, at least one of the pivot means being fixed to the frame, the axis of the pivot means and the thread gaging teeth having a relationship with respect to each other ranging from being in the same plane to an angularity between the planes thereof in excess of the helix angle of a perfect thread, and the wheels being rotated solely by the engagement of the threads on the test part with the gaging teeth of the wheels.

12. A thread gage for gaging threads previously formed on a test part comprising a frame, a plurality of gaging wheels having smooth thread gaging ribs around at least a portion of the periphery thereof for contact only with a test part at a plurality of points around the circumference thereof and which test part moves axially only with respect thereto, pivot means for each wheel carried by the frame in spaced relation supporting the wheels for rotation, at least one of the pivot means being fixed to the frame, and the axis of the pivot means and the thread gaging ribs having a relationship with respect to each other ranging from being in the same plane to an angularity between the planes thereof in excess of the helix angle of a perfect thread.

13. A thread gage for gaging threads previously formed on a test part comprising a frame, a plurality of wheels having smooth thread gaging teeth around at least a portion of the periphery thereof for contact only with a test part at a plurality of points around the circumference thereof and which test part moves axially only with respect thereto, pivot means for each wheel carried by the frame in spaced relation and supporting the wheels, at least one of the pivot means being fixed to the frame, the axis of the pivot means and the thread gaging teeth having a relationship with respect to each other ranging from being in the same plane to an angularity between the planes thereof in excess of the helix angle of a perfect thread, means mounting one gaging wheel for movement towards and away from the other, and indicating means connected with the mounting means to indicate the movement of the gaging wheel.

14. A thread gage for gaging threads previously formed on a test part comprising a frame, a plurality of wheels having smooth thread gaging teeth around at least a portion of the periphery thereof for contact only with a test part at a plurality of points around the circumference thereof, which test part moves axially only with respect thereto, pivot means for each wheel carried by the frame in spaced relation and supporting the wheels, one of the pivot means being fixed to the frame, the axis of the pivot means and the thread gaging teeth having a relationship with respect to each other ranging from being in the same plane to an angularity between the planes thereof in excess of the helix angle of a perfect thread, a block mounting one of the pivot means and its gaging wheel, parallel spring means supporting the block for parallel movement towards and away from the other, and an indicator connected with the movable block to indicate the movement of the gaging wheel.

15. A thread gage for gaging threads previously formed on a test part comprising a frame, a plurality of wheels having smooth thread gaging teeth around at least a portion of the periphery thereof for contact with a test part at a plurality of points around the circumference thereof and which test part moves axially with respect thereto, pivot means for each wheel carried by the frame in spaced relation and supporting the wheels, at least one of the pivot means being fixed to the frame, each gaging tooth lying in a radial plane including the axis of the pivot means, and each gaging wheel and its pivot means being disposed relatively at an angle with respect to the other corresponding to twice the helix angle of the threads on a perfect test part.

16. A thread gage for gaging threads previously formed on a test part comprising a frame, a plurality of wheels having straight thread gaging teeth around at least a portion of the periphery thereof for contact with a test part at a plurality of points around the circumference thereof and which test part moves axially with respect thereto, pivot means for each wheel carried by the frame in spaced relation and supporting the wheels, at least one of the pivot means being fixed to the frame, the axis of the pivot means being parallel to the thread gaging teeth, and each gaging wheel and its pivot means being disposed relatively at an angle with respect to the other corresponding to twice the helix angle of the threads on a perfect test part.

17. A thread gage for gaging threads previously formed on a test part comprising a frame, a pair of wheels having a groove around the periphery thereof and smooth thread gaging teeth around the groove and at least a portion of the periphery thereof for contact only with a test part at a plurality of points around the circumference thereof and which test part moves axially only therebetween, pivot means for each wheel carried by the frame in spaced relation and supporting the wheels in cooperating relation, the pivot means for each wheel being fixed to the frame, the axis of the pivot means and the thread gaging teeth having a relationship with respect to each other ranging from being in the same plane to an angularity between the planes thereof in excess of the helix angle of a perfect thread, and means for aligning the wheels and the thread gaging teeth thereton for rotating the same in cooperative relation.

18. A thread gage for gaging threads previously formed on a test part comprising a frame, a pair of wheels having a groove around the periphery thereof and smooth thread gaging teeth around the groove and at least a portion of the periphery thereof for contact only with a test part at a plurality of points around the circumference thereof and which test part moves axially only therebetween, pivot means for each wheel carried by the frame in spaced relation and supporting the wheels in cooperating relation, the pivot means for each wheel being fixed to the frame, the axis of the pivot means and the thread gaging teeth having a relationship with respect to each other ranging from being in the same plane to an angularity between the planes thereof in excess of the helix angle of a perfect thread, means for aligning the wheels nad the thread gaging teeth thereon for rotating the same in cooperative relation, and a recss in the periphery of each wheel extending radially inwardly from the gaging teeth.

PAUL W. JOHNSON.

REFERENCES CITED

The following references are of record in the file of this patent:

UNITED STATES PATENTS

| Number | Name | Date |
|---|---|---|
| 1,603,808 | Shane | Oct. 19, 1926 |
| 1,908,253 | Johnson | May 9, 1933 |
| 1,949,767 | Thompson | Mar. 6, 1934 |
| 2,073,365 | Darlington | Mar. 9, 1937 |
| 2,318,970 | Richmond | May 11, 1943 |
| 2,407,576 | Rickenmann | Sept. 10, 1946 |